Sept. 28, 1965   R. T. BURNETT   3,208,557
SELF-ENERGIZING DISK BRAKE
Original Filed Jan. 13, 1954   2 Sheets-Sheet 1
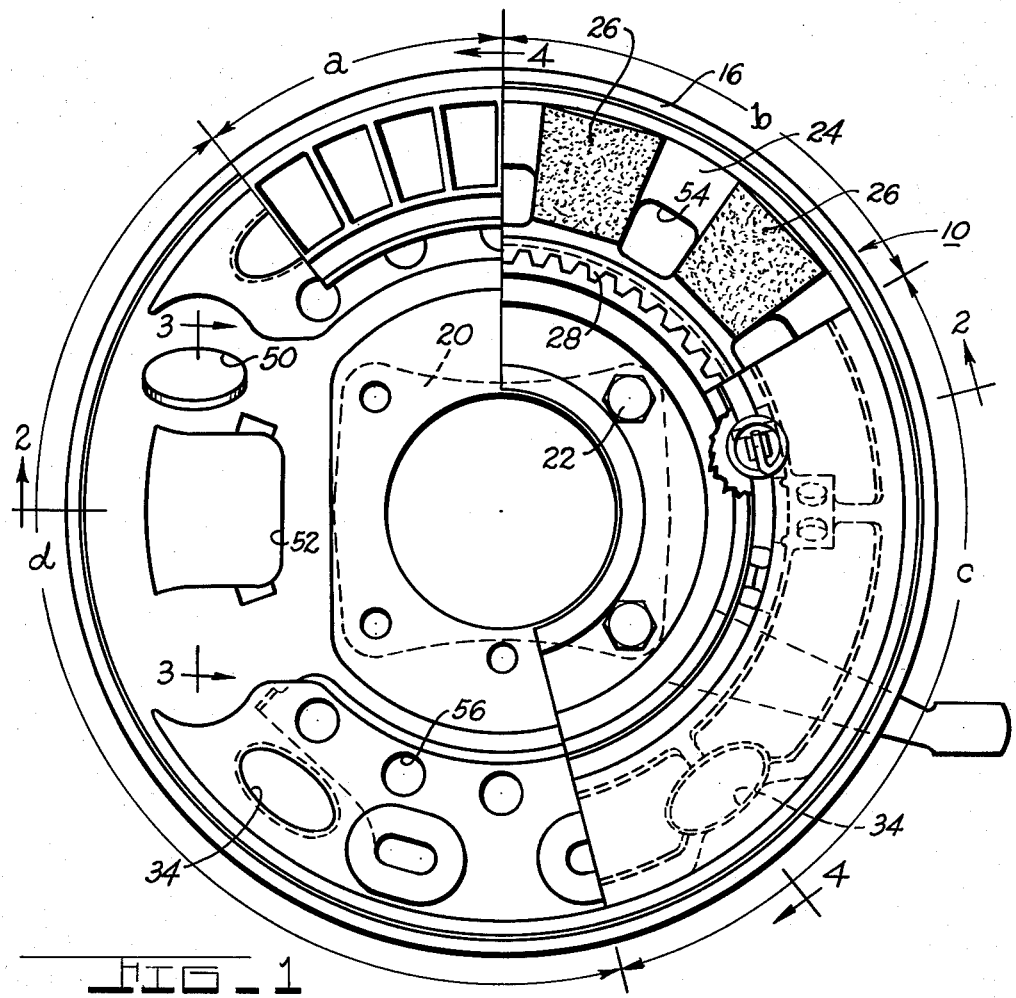
FIG_1
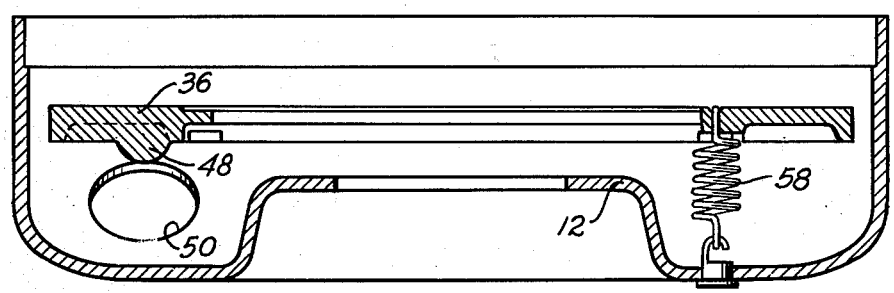
FIG_2
INVENTOR.
RICHARD T. BURNETT.
BY
Sheldon F. Razer
ATTORNEY.

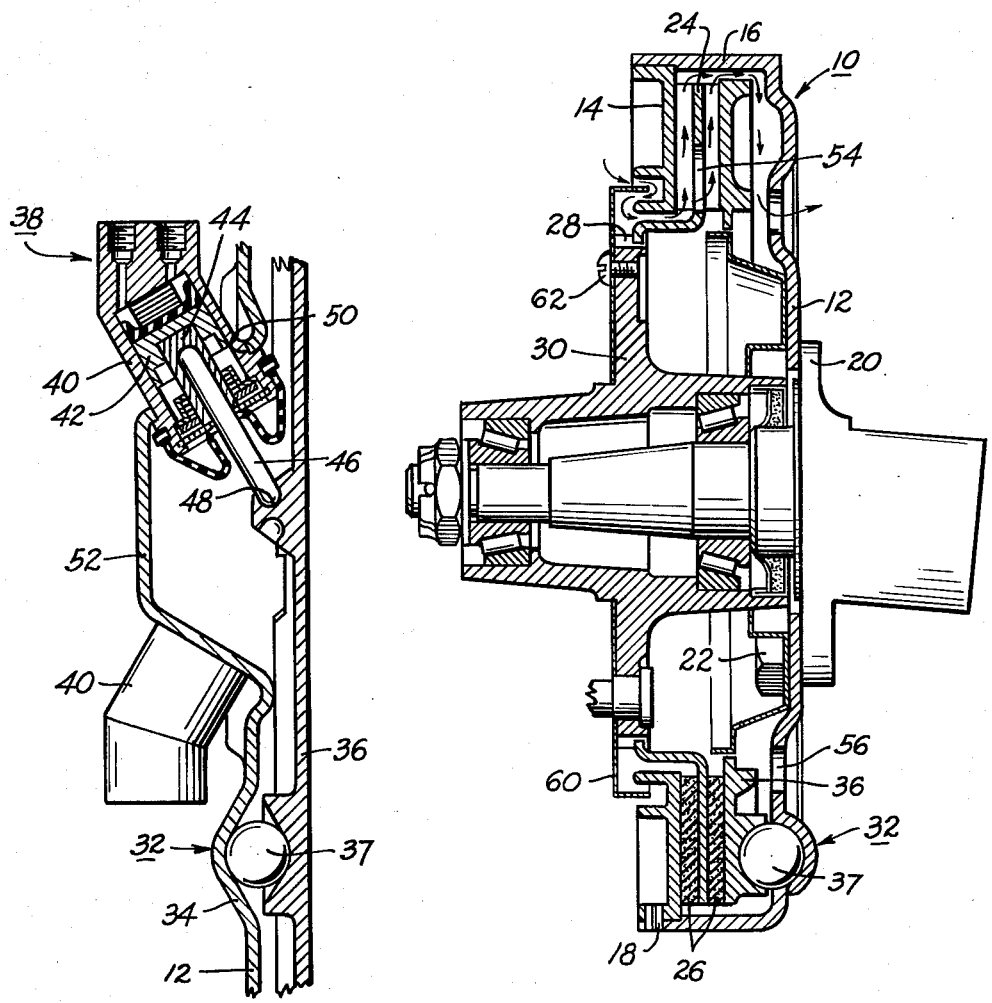

United States Patent Office
3,208,557
Patented Sept. 28, 1965

3,208,557
SELF-ENERGIZING DISK BRAKE
Richard T. Burnett, South Bend, Ind., assignor to The Bendix Corporation, South Bend, Ind., a corporation of Delaware
Application Aug. 8, 1960, Ser. No. 48,160, now Patent No. 3,096,855, dated July 9, 1963, which is a division of application Ser. No. 403,672, Jan. 13, 1954, now Patent No. 2,955,681, dated Oct. 11, 1960. Divided and this application Sept. 26, 1962, Ser. No. 226,401
3 Claims. (Cl. 188—72)

This application for patent is a division of my copending application Serial No. 48,160 filed August 8, 1960, now U.S. Patent No. 3,096,855, which in turn is a division of U.S. Patent No. 2,955,681, filed January 13, 1954. This invention relates to disk brakes and more particularly to improvements in disk type brakes wherein the friction-producing elements are self-energizing components of the brake.

An object of this invention is to provide a disk brake with friction means which moves in a composite axial and circumferential direction in combination with actuating means which imparts an applying thrust on the friction means and acting in the same general angular direction as the resultant composite movement of the friction means.

Another object of the invention is to provied a disk brake in which the friction means, the actuating means and anchoring means for the friction means are co-related in such a manner to effect maximum efficiency of the applying force exerted on the friction means by the actuating means.

A further object of the invention is to obtain an improved wheel cylinder construction which provides for the multi-directional movement of the member to be applied.

The above and other objects and features of the invention will appear more fully hereinafter from a consideration of the following description, taken in connection with accompanying drawings, wherein a plurality of embodiments of the invention are illustrated by way of example.

In the drawings:

FIGURE 1 is a composite view of a side elevation of the brake assembly illustrating in segments; (a) the brake reaction plate, (b) a section view taken between the reaction plate and rotor viewed toward the inboard side of the brake, (c) a section between the rotor and pressure plate looking toward the inboard side of the brake, and (d) a section view taken between the pressure plate and backing plate looking toward the inboard side of the brake;

FIGURE 2 is a section view taken on the line 2—2 of FIGURE 1;

FIGURE 3 is a fragmental section view taken on the line 3—3 of FIGURE 1 and illustrating the actuating means for applying the brake; and FIGURE 4 is a section view of the brake taken on line 4—4 of FIGURE 1.

Referring to FIGURES 1 to 4, a nonrotatable U-shaped cross section member designated generally by reference numeral 10 consists of a backing plate 12 and reaction plate 14 secured to cylindrical flange 16 by a plurality of fastening members 18; the nonrotatable backing plate 12 is in turn, secured to a suitable fixed member such as axle flange 20 by a plurality of fastening means 22.

A rotor 24, having friction pads 26 circumferentially spaced along either side thereof, has a splined connection 28 with a rotatable member such as hub 30. Located at spaced points around the circumference of the brake are a plurality of camming devices 32 consisting of ball-ramp combinations, the ramps 34 being recessed portions in the backing plate 12 with oppositely facing recesses in pressure plate 36. Balls 37 are adapted to ride up the ramp portions 34 upon relative circumferential movement of the pressure plate 36 and backing plate 12 thereby causing an axial thrust on the pressure plate 36.

Referring to FIGURE 3, an operator-controlled hydraulic actuator 38 is operatively connected to pressure plate 36. The hydraulic actuator 38 consists of a wheel cylinder 40, a piston 42 reciprocably received therein, a sleeve 44 positioned in the head of said piston 42 and a thrust link 46 operatively engaging an abutment 48 on the pressure plate 36. The actuator 38 is received through an opening 50 in the support member 12. The support 12 is dished at 52 to accommodate the actuator.

It will be noted that the axis of the wheel cylinder 40 and the direction of movement of the thrust link 46 is inclined with respect to the pressure plate 36, at the same angularity as ramps 34. The purpose of this inclination will become clearer later in this disclosure in connection with the operation of the device.

In the present illustration of the invention, two diametrically oppositely located wheel cylinders are used. The actual number of wheel cylinder actuators is a matter of design preference; the number actually disclosed here is only for purposes of exemplification.

The rotor 24 is provided with a plurality of openings 54 located between the friction pads 26 spaced around the circumference of the rotor. This permits passage of air through the brake assembly, around either side of the rotor in the direction and general path indicated by the arrows in FIGURE 4. The backing plate 12 contains a series of openings 56 which permit the air to pass through the brake assembly at the inboard side of the brake thereby making for complete circulation of air throughout the assembly.

A plurality of return springs 58 located in the recessed portions interconnect the support plate 12 and pressure plate 36 for yieldably urging the pressure plate 36 to retracted position. The brake assembly may include a suitable shield such as dust cover 60 fastened to the rotatable hub 30 by screws 62 as shown in FIGURE 4. There is sufficient clearance between the dust cover 60 and reaction plate 14 to permit the circulation of air therebetween.

In operation, fluid pressure generated from an appropriate master cylinder source (not shown) causes movement of the piston 42 (see FIGURE 3) in a generally downward direction. This movement of the piston brings about axial and circumferential movement of pressure plate 36 thereby engaging pressure plate 36 with one of the sides of the rotor 24; the rotor 24 having splined connection 28 with wheel hub 30 is forced to slide axially into frictional engagement with reaction plate 14. The engagement of the pressure plate 36 with the rotor 24 causes camming devices 32 to exert axial thrust on the pressure plate 36, clamping the rotor 24 between the pressure plate 36 and reaction plate 14. The torque reaction from the interengagement of the rotor 24, pressure plate 36, and reaction plate 14 is transmitted through the support member 12 to the nonrotatable axle flange 20.

From a consideration of the operation of the brake unit it will be noted that the movement of the pressure plate is a composite axial and circumferential motion. It is important for the input force actuating the brake to be exerted in the same general direction as the movement of the member to be applied, and for this reason the wheel cylinder in the present invention is oriented so that the axis thereof is in the same general direction as the resultant movement of the pressure plate to be applied thereby. that is, the thrust link 46 has the same general direction imposed thereupon as the direction of movement of the member which it is designed to actuate. This novel location of the actuating means produces maximum backing for a given input force and minimum angularity of the connecting link during actuation and retraction of the pressure plate 36.

When the operator releases the pressure generated in the wheel cylinder 38, return springs 58 retract the pressure plate 36, disengaging its frictional contact with rotor 24 and releasing frictional contact of rotor 24 with reaction plate 14.

Rotor 24 by reason of the circumferentially spaced friction pads 26, acts as a pump driving air through the braking system, the general direction of which is shown in FIGURE 4. The openings 54 in the rotor by-pass the inflowing air on either side of the rotor and cause complete circulation of air around the periphery of the brake assembly. The passage of air is then across and between the ramps of the camming devices, and through the openings 56 where the air is expelled to complete the circulation through the system.

Although a particular embodiment of my invention has been described, it will be understood by those skilled in the art that the object of the invention may be attained by use of constructions different in certain respects from that disclosed without departing from the underlying principles of the invention.

I claim:

1. In a disk brake: a rotor having friction surfaces thereon, support means extending on one side of said rotor, means movable in a direction toward and away from said rotor and in a circumferential direction for engaging said rotor to effect braking thereof, a fluid cylinder housing carried by said support means and having a bore whose axis is at an inclination with the plane of said rotor friction surfaces, a fluid actuated piston slidable within said bore operably connected to said movable means for imparting an applying thrust to said movable means, for applying the same against said rotor, the axis of said bore being in the same general angular direction as the resultant of the composite movement toward said rotor and circumferential movement of said pressure plate, said support means further having an anchoring abutment surface generally parallel to the direction of said applying thrust and so arranged and located to receive a portion of the load exerted on said movable means by said rotor during brake application.

2. In a disk brake: a rotor having friction surfaces thereon, support means extending on one side of said rotor, means movable in a direction toward and away from said rotor and in a circumferential direction for engaging said rotor to effect braking thereof, a fluid cylinder housing carried by said support means and having a bore whose axis is at an inclination with the plane of said rotor friction surfaces, a fluid actuated piston slidable within said bore operably connected to said movable means for applying the same against said rotor, the axis of said bore being in the same general angular direction as the resultant of the composite movement toward said rotor and circumferential movement of said movable means.

3. In a disk brake: a rotor having friction surfaces thereon, support means located on one side of said rotor, a pressure plate located on said one side of said rotor and mounted for movement toward and away from said rotor and in a circumferential direction, friction material located between said pressure plate and said rotor, a fluid cylinder housing carried by said support means and having a bore whose axis is at an inclination with the plane of said rotor friction surfaces, a fluid actuated piston slidable within said bore operably connected to said pressure plate for imparting an applying thrust to said pressure plate, the axis of said bore being in the same general angular direction as the resultant of the composite movement toward said rotor and circumferential movement of said pressure plate, said support means having an anchoring abutment surface which is generally parallel to the direction of thrust imparted by said actuator to said pressure plate, a camming surface on said pressure plate opposite said support means anchoring abutment surface, a ball retained between said surfaces for effecting camming action on said pressure plate.

References Cited by the Examiner

UNITED STATES PATENTS

| 2,225,562 | 12/40 | Lambert | 188—72 |
| 2,300,532 | 11/42 | Ash | 188—72 |
| 2,371,108 | 3/45 | Oelkers | 188—72 |
| 2,373,572 | 4/45 | Lambert | 188—72 |

ARTHUR L. LA POINT, *Primary Examiner.*

EUGENE G. BOTZ, *Examiner.*